United States Patent
Blaine et al.

(10) Patent No.: US 7,251,537 B1
(45) Date of Patent: Jul. 31, 2007

(54) PROCESSING OF WORK PIECE BASED ON DESIRED END PHYSICAL CRITERIA

(75) Inventors: George Blaine, Lake Stevens, WA (US); Jon Hocker, Bothell, WA (US); David Faires, Lake Forest Park, WA (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 11/323,480

(22) Filed: Dec. 29, 2005

Related U.S. Application Data

(60) Provisional application No. 60/640,282, filed on Dec. 30, 2004.

(51) Int. Cl.
*G06F 19/00* (2006.01)
*B26D 1/00* (2006.01)

(52) U.S. Cl. .......................... 700/29; 700/173; 83/367; 452/156

(58) Field of Classification Search ............ 700/28–31, 700/97, 173; 83/13, 365, 367, 368; 452/156, 452/168
See application file for complete search history.

(56) References Cited

U.S. PATENT DOCUMENTS

| | | | |
|---|---|---|---|
| 4,656,904 A * | 4/1987 | Rayment et al. ............... 83/289 |
| 4,662,029 A * | 5/1987 | Helsene et al. ............. 452/156 |
| 4,726,094 A * | 2/1988 | Braeger ....................... 452/157 |
| RE33,581 E * | 4/1991 | Nicoli et al. .................. 435/7.2 |
| 5,324,228 A * | 6/1994 | Vogeley, Jr. ................ 452/158 |
| 5,585,603 A * | 12/1996 | Vogeley, Jr. ............. 177/25.13 |
| 5,937,080 A * | 8/1999 | Vogeley et al. ............. 382/110 |
| 6,277,019 B1 * | 8/2001 | Veldkamp et al. .......... 452/134 |

FOREIGN PATENT DOCUMENTS

GB    2 364894   *   2/2002

* cited by examiner

*Primary Examiner*—Leo Picard
*Assistant Examiner*—Douglas S. Lee
(74) *Attorney, Agent, or Firm*—Christensen O'Connor Johnson Kindness pllc

(57) ABSTRACT

Processing a work piece by first scanning the work piece. The work piece is modeled to determine its outer perimeter and/or how the work piece could be divided into portions of specific areas and perimeters based on desired portion sizes of desired areas and perimeters. The modeled work piece and/or the modeled portions are compared with the one or more desired perimeter configurations. The deviation of the modeled outer perimeter size of the work piece and/or portions from the desired perimeter configuration(s) is calculated. Based on such calculations, one or more steps in processing the work piece and/or portions therefrom is carried out. Such one or more steps may include modeling the work piece again, using different modeling criteria or options, if the calculated deviation is outside an acceptable range.

32 Claims, 3 Drawing Sheets

PROCESSING OF WORK PIECE BASED ON DESIRED END PHYSICAL CRITERIA

CROSS-REFERENCE TO RELATED APPLICATION

This application is based on and claims the benefit of U.S. Provisional Application No. 60/640,282, filed Dec. 30, 2004.

TECHNICAL FIELD

The present application relates generally to equipment and techniques for processing work pieces, such as food products, and more specifically to portioning work pieces into specified sizes based on desired end criteria and to scanning work pieces before and/or after portioning to evaluate end work piece sizes.

BACKGROUND

Work pieces, including food products, are cut or otherwise portioned into smaller portions by processors in accordance with customer needs. Also, excess fat, bone and other foreign or undesired materials are routinely trimmed from food products. It is usually highly desirable to portion and/or trim the work pieces into uniform shapes, thicknesses, and/or sizes in accordance with customer needs. Much of the portioning/trimming of work pieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into optimum sizes, weights, or other criteria being used.

Customers who purchase sandwiches and similar items from quick-service restaurants like to see some meat extending beyond or at least even with the bun perimeter, not hidden inside the bun. On the other hand, too much meat protruding from the bun, such as a long, thin piece of meat within a round bun, is undesirable as well.

Historically, determining shape compliance for portioned product has been carried out with dimensional template checking. Workers take samples of the portioned product and place them on a printed piece of plastic or other template showing the bun. Workers literally count squares (printed on the template) to determine the areas inside and outside of the bun.

Quality checks of sandwich bun coverage are performed both with raw product and with cooked product. Meat, fish, and poultry shrink when cooked, and does so non-uniformly. This makes manual prediction of whether or not the product will be appropriately sized a difficult task.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A scanner of a portioning system scans a work piece to determine the outer perimeter of the work piece as well as the area of the work piece. A computer is programmed to compare the outer perimeter of the work piece with one or more desired perimeter configurations and the deviation therefrom determined. Based on such calculated deviation, one or more steps in processing the work piece is carried out under the control of the computer.

When determining the outer perimeter of the work piece, expected changes to the outer perimeter due to further processing of the work piece are taken into consideration. Such further processing may include cooking, steaming, frying, baking, roasting, grilling, boiling, battering, freezing, marinating, rolling, flattening, drying, dehydrating, tenderizing, cutting, portioning, trimming, and slicing.

In calculating via the computer the deviation of the determined perimeter of the work piece from the desired perimeter configuration, one or more parameters can be used. Such parameters may include: comparing the area of the work piece with the area of the desired perimeter configuration; comparing the work piece area positioned within the perimeter of the desired work piece configuration with the total area of the desired perimeter configuration; comparing the total outside perimeter area of the work piece overlaid on the desired perimeter configuration with the area of the desired perimeter configuration; and comparing the area defined by the determined outer perimeter of the work piece extending beyond the desired perimeter configuration when overlaid on the desired perimeter configuration with the area defined by the desired perimeter configuration.

The computer is also programmed to use the scanning information to model how the work piece may be cut into portions, having desired areas and shapes based on predetermined configurations or templates. The computer is programmed to thereafter determine the deviation of the modeled areas and shapes of the portions from the desired configurations. If the deviation is not within an acceptable level, the computer may repeat the modeling of the work piece using other cutting options or criteria until an acceptable deviation is reached. Thereupon, portioning and/or other processing of the work piece and portions therefrom are carried out under the control of the computer. The computer does take into consideration the effects of subsequent processing on the areas and shapes of the projected portions.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
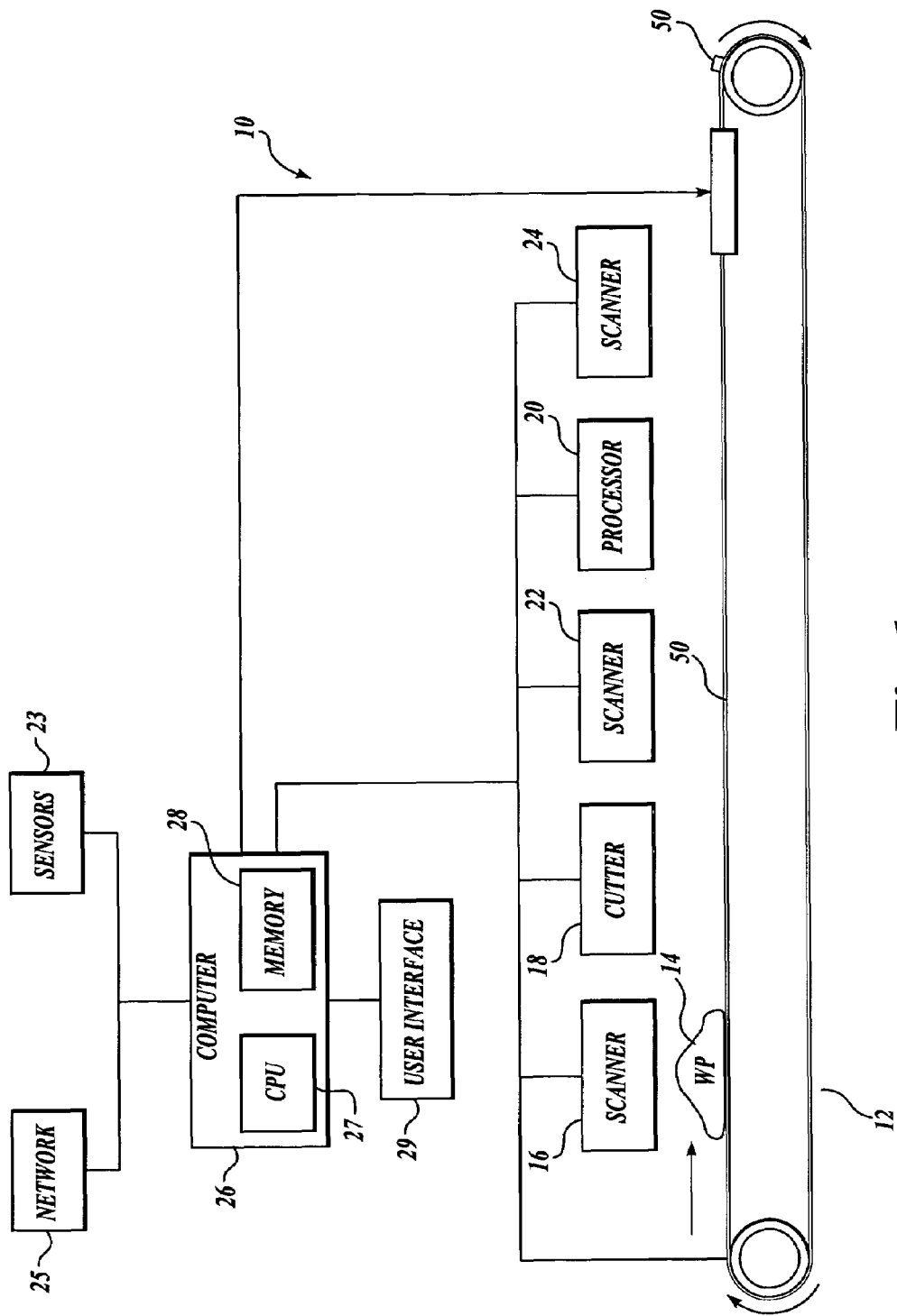
FIG. 1 is a schematic view of a disclosed embodiment.

FIG. 1 schematically illustrates an embodiment of the present invention consisting of system 10. The system 10 includes a conveyor 12 for carrying a work piece (WP) 14 to be trimmed, portioned, or otherwise processed. Although a singular conveyor is shown, multiple conveyors may be used with system 10. The system 10 includes a first scanner 16 for scanning the work piece 14 and a cutter 18 cutting the work piece into one or more pieces or to a desired size. Also, other processing tools or equipment 20 can be utilized in addition to, or in place of, cutter 18. Further, additional scanners can be employed to scan the work piece and/or portions cut therefrom later along the processing line. The conveyor 12, scanner 16, and cutter 18 are coupled to, and controlled by, a processor or computer 26.

Generally the scanner 16 scans the work piece 14 to produce scanning information representative of the work piece and forwards the scanning information to the computer/processor 26. The computer 26 analyzes the scanning information to calculate the outer perimeter of the scanned work piece and the area of the scanned work piece. The computer models the work piece 14 in terms of how the work piece may be cut into portions, as well as subsequently processed. The computer also determines the outer perimeters of the portions to be cut from the work piece with one or more desired perimeter configurations or templates stored in the computer memory 28 or elsewhere. The computer thereafter calculates the deviation of the determined perimeters of the portions to be cut from the desired perimeter configuration(s). Based on this calculated deviation, the computer may repeat the above modeling of the work piece using other cutting options until an acceptable deviation is reached between the determined perimeters of the portions to be cut and the desired perimeter configurations. Thereafter, further portioning and/or further processing and/or scanning of the work piece occurs.

Figure 2:
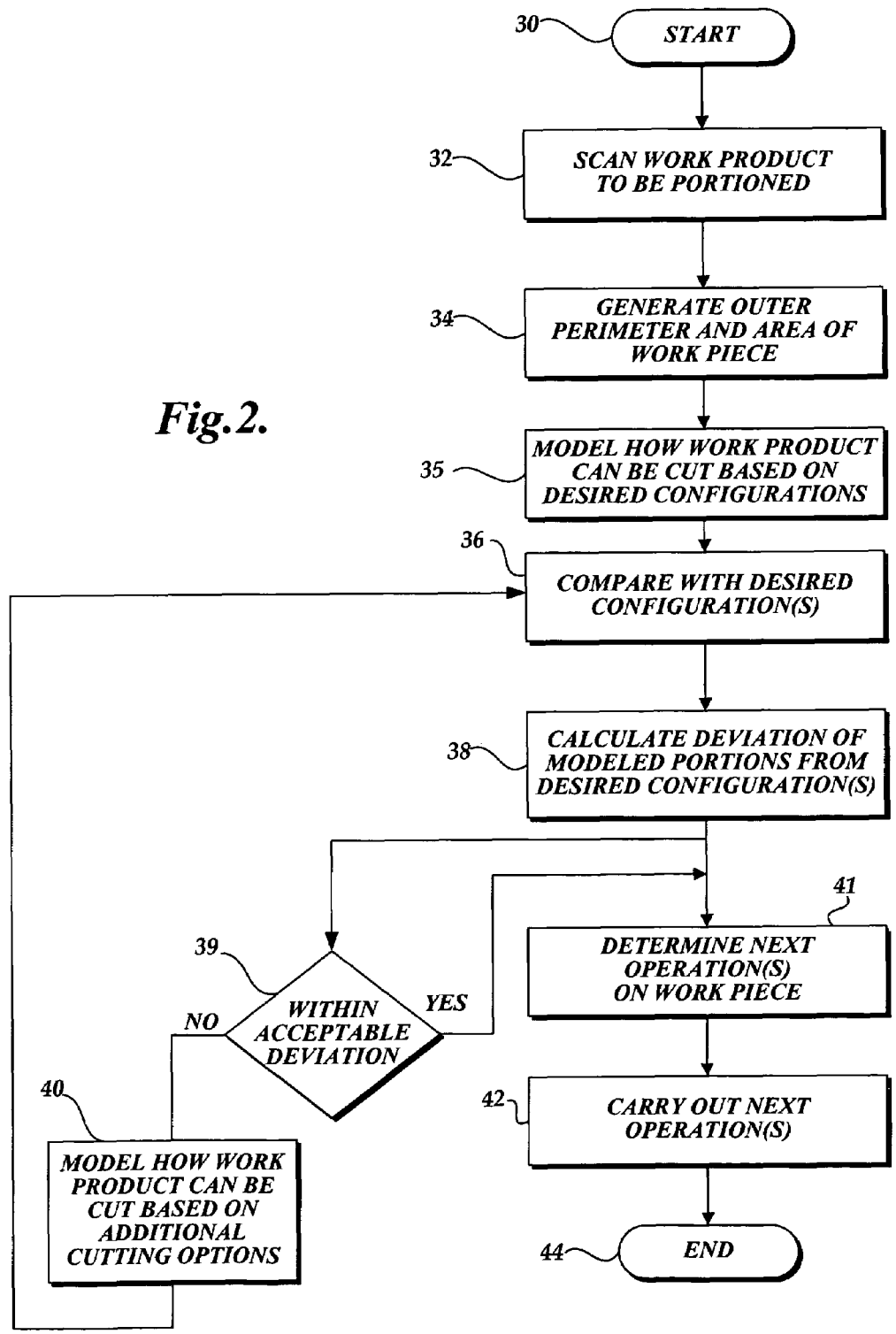
FIG. 2 is a flow diagram of a disclosed embodiment.
Figure 3A:
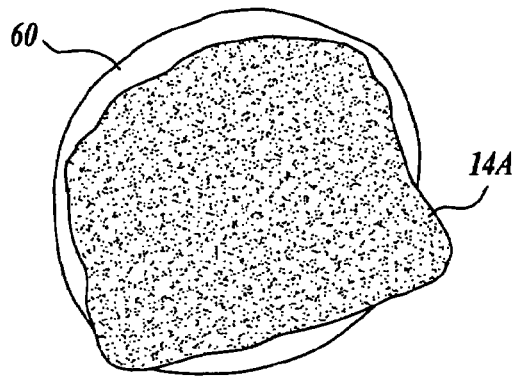
FIG. 3A through FIG. 3E are views of food products analyzed using a disclosed embodiment.
Figure 3B:
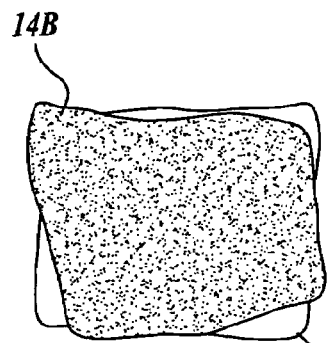
Figure 3C:
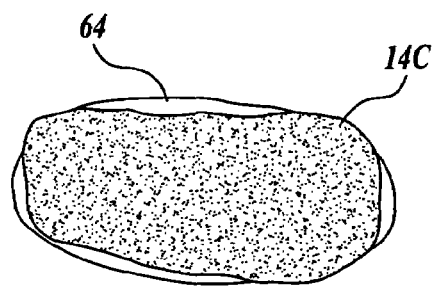
Figure 3D:
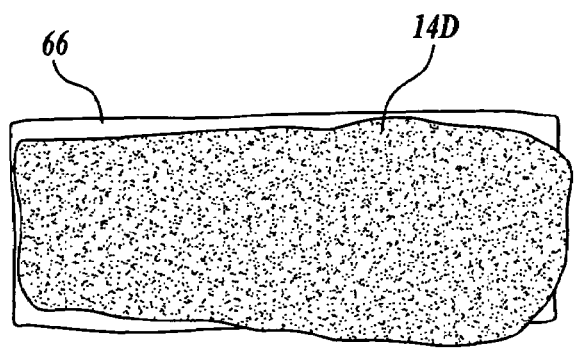
Figure 3E:
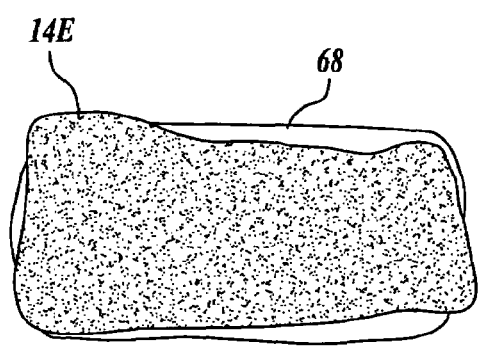

FIG. 2 is a flow chart illustrating an overall process using system 10. The method starts at 30 and includes step 32 of scanning the work piece and step 34 of generating or determining the outer perimeter of the work piece scanned as well as the area occupied by the work piece. In step 35, the work piece is modeled to determine how it may be cut into desired portions based on desired shapes of the work piece. Information about such desired shapes may be stored in the computer memory 28. In step 36, the shapes and sizes of the portions to be cut from the work piece are compared with data and/or templates coinciding with the desired shapes of the portions to be cut, or coinciding with shapes complementary to the portions or shapes with some other relationship to the work piece. For example, the template can be in the shape of a bun and the proposed portion can be a chicken breast, a beef patty, a fish fillet, or other food product.

In step 38, the deviation(s) between the calculated perimeter(s) of the portions to be cut and the perimeters of the contemplated or desired configuration(s) are calculated. If this deviation is within acceptable limits, then this information is used in step 41 to determine the next or next several processing steps with respect to the work piece and portions to be cut therefrom which are carried out at 42, thereby reaching the end 44 of the method.

In step 39, if the deviation(s) between the calculated perimeter(s) of the portions to be cut and the perimeters of the contemplated or desired configuration(s) are not within acceptable limits, then at step 40 the work piece is again modeled by the computer using additional or other criteria or options. Such other options or criteria may include, for example, beginning the analysis of determining what shapes and sizes may be cut from the work piece at a different location on the work piece, or rotating the work piece and then beginning the analysis of what shapes and sizes may be cut from the work piece or increasing the sizes of the portions to be cut to an oversize, or various other cutting options. Thereafter, the contemplated portions to be cut are again compared with the desired shapes and sizes, and then the deviations therefrom calculated. If the deviations between the perimeters of the portions contemplated to be cut from the work piece are now within an acceptable range, then processing the work piece can take place, which, as noted above, may include portioning of the work piece and then optionally carrying out additional process steps on the work piece or portions cut therefrom.

However, if the deviation of the re-modeled work piece is still not within acceptable limits, then further modeling of the work piece can take place until an acceptable deviation range is achieved. Alternatively, a decision may be made that the work piece is not acceptable for the contemplated use, in which case the work piece may be rejected and/or diverted for a different use.

Rather than being used in conjunction with portioning the work piece, the present invention can be used after a work piece has been portioned, or when portioning of the work piece is not contemplated. As such, the present invention is used with scanner 16. In this regard, the scanner 16 scans the work piece 14 to produce scanning information representative of the work piece and forwards the scanning information to the computer 26. The computer analyzes the scanning information to calculate the outer perimeter of the scanned work piece and the area of the scanned work piece. The computer compares the determined outer perimeter of the work piece with one or more desired perimeter configurations or templates stored in the computer memory or elsewhere. The computer thereafter calculates the deviation of the determined perimeter of the work piece from the desired perimeter configuration. Based on this calculated deviation, further processing of the work piece may occur. Also based on this calculated deviation, sorting of the work piece may occur or a determination may be made that the work piece is not suitable for the intended purpose, and thus the work piece is rerouted, perhaps for different usage.

Describing the foregoing in more detail, the conveyor 12 carries the work piece 14 beneath a scanning system 16. The scanning system may be of a variety of different types, including a video camera (not shown) to view a work piece 14 illuminated by one or more light sources. Light from the light source is extended across the moving conveyor belt 48 to define a sharp shadow or light stripe line, with the area forwardly of the transverse beam being dark. When no work piece 14 is being carried by the infeed conveyor 12, the shadow line/light stripe forms a straight line across the conveyor belt. However, when a work piece 14 passes across the shadow line/light stripe, the upper, irregular surface of the work piece produces an irregular shadow line/light stripe as viewed by a video camera directed diagonally downwardly on the work piece and the shadow line/light stripe. The video camera detects the displacement of the shadow line/light stripe from the position it would occupy if no work piece were present on the conveyor belt. This displacement represents the thickness of the work piece along the shadow line/light stripe. The length of the work piece is determined by the distance of the belt travel that shadow line/light stripes are created by the work piece. In this regard, an encoder 50 is integrated into the infeed conveyor 12, with the encoder generating pulses at fixed distance intervals corresponding to the forward movement of the conveyor.

In lieu of a video camera, the scanning station may instead utilize an x-ray apparatus (not shown) for determining the physical characteristics of the work piece, including its shape, mass, and weight. X-rays may be passed through the object in the direction of an x-ray detector (not shown). Such x-rays are attenuated by the work piece in proportion to the mass thereof. The x-ray detector is capable of measuring the intensity of the x-rays received thereby, after passing through the work piece. This information is utilized to determine the overall shape and size of the work piece 14, as well as the mass thereof. An example of such an x-ray scanning device is disclosed in U.S. Pat. No. 5,585,603, incorporated by reference herein. The foregoing scanning systems are known in the art and, thus, are not novel per se. However, the use of these scanning systems in conjunction with the other aspects of the described embodiments are believed to be new.

The data and information measured/gathered by the scanning device(s) is transmitted to computer 26, which records the location of the work piece on the conveyor 12 as well as the shape, size, outer perimeter, area, and other parameters of the work piece. Computer 26 can be used to determine and record these parameters with respect to the work piece as it exists on the conveyor 12 as well as determine these parameters for the work piece or for portions cut from the work piece after further processing or after completion of processing. For example, if the work piece 14 is in the form of a raw chicken breast, fish fillet, or similar work piece, computer 26 can be used to determine the overall size, shape, and weight of the work piece, or portions thereof, after cooking, whether such cooking is by steaming, frying, baking, roasting, grilling, boiling, etc. Typically, such shrinkage is nonsymmetrical and not easily quantifiable but is capable of being modeled, especially with the use of a computer. Such model(s) and data relative thereto may be stored in the memory portion 28 of the computer 26. Such model(s) and data can be employed to determine the perimeter of the work piece, or portions thereof, after subsequent one or more processing steps.

As illustrated in FIG. 1, the computer 26 includes a central processing unit 27 and memory 28. As noted above, data concerning desired work piece, or portion shapes and sizes, as well as the effect on work pieces of further processing, may be stored in the computer memory 28. The information stored in memory can be readily selected by user via user interface 29, for example, when changing product lines. For instance, the user may be processing chicken breasts for a particular customer who may require specific shapes and sizes for the portions to be cut from the chicken breasts. When the order for that customer is filled, the user may switch the mode of the computer to meet the specifications of a different customer. The switch may be automated and triggered by a counter that keeps track of the number of product portions that have been processed, or the switch may be carried out manually to allow the user time to retool any apparatus or recalibrate.

As also shown in FIG. 1, the computer 26 may be in communication with a network system 25, which allows the computer 26 to talk and share information with other computers. The computer 26 can also control and drive other equipment or hardware, for instance cutter 18, processing equipment 20, as well as scanners 22 and 24. Further, the computer 26 can retrieve information from the various scanners as well as from sensors 23 that may be used with the present invention to guide or direct a multitude of systems.

The computer 26 is next used to compare the calculated perimeter and area of the work piece and/or portions to be cut from the work piece with one or more desired perimeter/area configurations or templates. Such configurations or templates may be models of buns, rolls, bagels, bread slices, baguettes, or similar food products, used in conjunction with fish fillets, chicken breasts, natural or formed beef riblets, or other similar products. The buns, rolls, etc., can be of various shapes, for example, circular, square, oval, rectangular, etc. Some of these shapes are shown in FIGS. 3A through 3E as 60–68. The comparison of the work piece 14, or portions cut from the work piece, with the desired perimeter configuration(s) or template(s) is carried out via the computer 26. In this regard, the computer 26 performs a "best fit" procedure so as to arrange the work piece perimeter, or the perimeters of portions cut from the work piece, both in rotational angle and relative position to best match the desired configuration(s) or template(s). In this regard, the centroid of the work piece may be placed in registry with the centroid of the desired configuration or template. Alternatively or in addition, the principal axis of the work piece and the desired configuration or template may be placed in alignment. Computing techniques for carrying out this "best fit" procedure is known in the art.

The comparison of the work piece 14, or portions cut from the work piece, with the desired perimeter configuration(s) or template(s) can be carried out by other methods. As an example of another method, two parallel lines are positioned in tangent to each side of the shape in question, whether the shape of the work piece or the shape of the desired configuration. These lines constitute the most narrow width of the shape. Next, a rectangle is drawn that touches all four sides of the shape in question using the foregoing two lines to encompass the narrowest width. All four edges of the drawn rectangle touch the shape but do not overlap it. The length and width of the rectangle is measured. This technique is used for both the work piece and the desired configuration, thereby to compare the "fit" between the work piece and the desired configuration. Although this technique has been described as used in conjunction with a drawn rectangle, the technique also could be used with other shapes, for instance, a hexagon or octagon.

As noted above, for certain types of food items, including the various types of sandwiches served at fast food restaurants, it is desirable that the meat is visible and even extends beyond the perimeter of the bun, roll, etc., so that the meat is not hidden inside the bun, roll, etc. On the other hand, it is not desirable if the meat extends too far beyond the perimeter of the bun, roll, etc. See, for example, meat items 14A–14E corresponding to buns, rolls, etc., 60–68. With these attributes in mind, the deviation(s) between the determined perimeter(s) of the work piece and/or portions to be cut from the work piece and the desired perimeter configuration(s) thereof, perhaps as predetermined by one or more template(s), is ascertained. In this regard, various parameters may be determined relating to such deviation.

A first parameter that may be determined is the area of the work piece or portion therefrom inside of the desired perimeter in comparison to the area of the desired perimeter. A "real world" example of this parameter may be the area of a chicken fillet inside of a bun relative to the area of the bun. In this "real world" example, an acceptable range for this parameter may be from about 0.7–1.0. As apparent, this parameter could never exceed 1.0.

A second parameter that may be determined is the total outside perimeter area of the work piece, or portion thereof, overlaid with the desired perimeter configuration as compared to the area of the desired perimeter configuration. In our "real world" example, this parameter would equate to the total plan view outside area of the meat and bun (overlaid on the bun) relative to the area of the bun. In this example, the likely acceptable range would be from approximately 1.0–1.3. This parameter can never be less than 1.0.

A third parameter that may be calculated simply consists of comparing the area of the work piece, or portion thereof, with the area of the desired perimeter configuration. In our "real world" example, this may consist of the area of the chicken fillet relative to the area of the bun. A likely acceptable range for this parameter would be from about 0.9–1.3, but in actuality this parameter could vary from zero to infinity.

A further parameter that may be determined is the area defined by the outer perimeter of the work piece, or portion thereof, that extends beyond the desired perimeter configuration when overlaid with the desired perimeter configuration in comparison with the area defined by the desired perimeter configuration. In our "real world" example, this perimeter equates to the area of the chicken fillet not covered by the bun in relationship to the area of the bun. Thus, this factor is related to the second factor discussed above.

Any one of the foregoing factors can be used to decide what further processing of the work piece, or portions therefrom, should occur. For example, how the work piece, or portions therefrom, should be portioned or trimmed, or if the work piece, or portions therefrom, should be utilized at all. The particular factor chosen may depend on which of the criteria or attributes discussed above are more or the most important. In addition, rather than utilizing a singular parameter, two or more parameters may be employed in making a decision as to how the work piece product, or portions therefrom, is to be further processed.

Further, the foregoing factors can be combined to arrive at a singular number utilizing standard equations. For example, a geometric mean equation, an arithmetic mean equation, or a root mean square equation. Moreover, the parameters that are combined can be weighted, depending on which of the parameters are deemed more important or less important. For example, is it more important to have meat product protruding from the bun versus some of the area internal of the bun not covered or occupied by the meat product?

Examples of how the various foregoing parameters may be combined into one meaningful dimensionless parameter with adjustable weighting factors or coefficients are set forth in the equations below. In these equations, the first three of the foregoing parameters are defined as follows:

RI equals work piece or portion area inside of desired perimeter configuration/area of desired perimeter configuration;

RO equals total outside perimeter area of the work piece or portion thereof overlaid with the desired perimeter configuration/area of the desired perimeter configuration; and RM equals area of the work piece or portion thereof/area of desired perimeter configuration.

The equations set forth below utilize the weighting coefficient "A" with the parameter "RI", the weighting coefficient "B" with the parameter "RO" and the weighting coefficient "C" with the parameter "RM". As noted above, the value of these weighting coefficients can reflect the value, desirability, undesirability, etc., of the foregoing factors relative to each other.

The foregoing coefficients and weighting coefficients can be combined in a weighted geometric mean equation with the single dimensionless parameter being labeled as "work piece coverage index." This equation is as follows:

$$\text{Work piece Coverage Index} = (RI^A \times RO^B \times RM^C)^{\left(\frac{1}{A+B+C}\right)} \quad \text{Eq. (1)}$$

The foregoing parameters with weighting coefficients can also be combined as an arithmetic mean utilizing the following equation:

$$\text{Work piece Coverage Index} := \frac{(RI \times A + RO \times B + RM \times C)}{(A+B+C)} \quad \text{Eq. (2)}$$

As a further alternative, the foregoing parameters and weighting coefficients can be combined into a single index using a root means square equation, as follows:

$$\text{Work piece Coverage Index} = \sqrt{\frac{(A \times RI^2 + B \times RO^2 + C \times RM^2)}{(A+B+C)}} \quad \text{Eq. (3)}$$

The foregoing equations can be applied to the real world example above of a sandwich composed of a chicken breast on a bun, with the following values for the parameters RI, RO, and RM and the following values for the weighting coefficients A, B, C:

RI=0.8

RO=1.2

RM=1.0

A=5

B=3

C=4

Combining the foregoing parameters and weighting coefficients using the geometric mean, arithmetic mean and RMS mean equations as set forth below results in bun coverage indices of 0.9537, 0.9667, and 0.9797. These indices may be used individually or even in combination as an evaluation of bun coverage provided by a particular standard chicken breast.

$$\text{Bun Coverage Index} = (0.8^5 \times 1.2^3 \times 1.0^4)^{\left(\frac{1}{5+3+4}\right)} = .9537 \quad \text{Eq. (4)}$$

$$\text{Bun Coverage Index} = \frac{(0.8^5 + 1.2^3 + 1.0^4)}{(5+3+4)} = .9667 \quad \text{Eq. (5)}$$

$$\text{Bun Coverage Index} = \sqrt{\frac{5 \times 0.8^2 \times 3 \times 1.2^2 + 4 \times 1.0^2}{5+3+4}} = .9797 \quad \text{Eq. (6)}$$

The foregoing indices can be used to determine the next step or steps in the processing of the work piece. As noted above, the steps can include cutting of the work piece, or portions therefrom, for example, portioning, trimming, slicing, etc. The next steps can also include various processing of the work piece or portions therefrom, including, for example, cooking, pre-cooking or post-cooking procedures as steps, for example, the cooking steps of steaming, frying, baking, roasting, grilling, boiling, drying, or dehydrating the work piece. Pre-cooking or post-cooking steps might include battering, marinating, rolling, flattening, tenderizing, or freezing the work piece. The foregoing indices can also be used to sort the work piece, or portions therefrom, for example, for various usages, or also to simply divert the work piece as not being usable in the present situation, for example, as the meat portion of a sandwich.

The foregoing indices can also be used to determine whether a different portion cutting strategy should be used for the work piece. If the indices are not within a desired range, then the work piece may be analyzed by the computer with different or additional cutting options. Such options might include modeling the work piece beginning at a different location on the work piece, rotating the work piece before beginning the modeling of the work piece, enlarging to an oversize condition the desired end portions in size or weight, etc. Thereafter, the foregoing process of determining the various factors relating to deviations between the determined perimeters of the portions to be cut from the work piece and the desired perimeter configurations may be analyzed. This process may be repeated until the deviation level is within an acceptable range. Thereafter, the work piece may be further processed, including cutting the work piece into the modeled portions and then carrying out additional processing of the portioned work pieces. Also, the foregoing analysis may determine that a work piece is not suitable for use and thus the work piece may be rejected or diverted for a more appropriate use.

In addition to initially scanning the work piece prior to modeling and portioning, the work piece may be scanned at other times along the processing thereof. As shown in FIG. 1, scanning with scanner 22 can occur after the portioning by cutter 18. Scanning with scanner 24 can also occur at other times, for instance after further processing of the work piece or portions thereof by processor 20 for the use of scanner 24. Use of such additional scanners can identify whether steps along the processing of the work piece require attention. Also, data concerning the processing of the work piece can be gathered from the various scanners used during the processing of the work piece, and these data can be analyzed using statistical or other methods. The results of this analysis can be used to control the operation of system 10 for optimum results, including adjusting or correcting equipment settings either automatically or via operator intervention.

The foregoing apparatus and method can be used with many food products, whether or not processing of the food product began through an automatic food portioning step. Food products with respect to which the present invention may be used include fish fillets, chicken breast fillets or half fillets, beef flank steaks, beef tri-tip steaks, pork chops, beef riblets, as well as food products that have been hand portioned or hand or machine formed. In addition, the present method can be used in virtually any step in the processing of the work piece, or portions therefrom, including food products from a raw, unprocessed, coated, cooked, or frozen state. Moreover, as noted above, the present method can be used to achieve desired bun coverage, for quality control purposes, or even to divert from processing unsuitable work pieces, or portions therefrom, so as to avoid the expense of full processing of the work piece, or portions therefrom.

While preferred embodiments have been illustrated and described, it will be appreciated that various changes can be made therein without departing from the spirit and scope of the invention.

Regarding one change, although the foregoing description discussed scanning by use of a video camera and light source, as well as by use of x-rays, other three-dimensional scanning techniques may be utilized. For example, such additional techniques may be by ultrasound or moiré fringe methods. In addition, electromagnetic imaging techniques may be employed. Thus, the present invention is not limited to use of video or x-ray scanning methods, but encompasses other three-dimensional scanning technologies.

The embodiments of the invention in which an exclusive property or privilege is claimed are defined as follows:

1. A portioning apparatus comprising:
   (a) a scanner for scanning a native work product as the work product is being transported past the scanner;
   (b) a data processor for receiving the data from the scanner and using such data to determine how the native work product may be portioned into a plurality of end products of predetermined criteria, including desired areas and two-dimensional shapes based on sets of predetermined desired areas and two-dimensional shapes for the portions to be cut;
   (c) wherein the data processor is programmed to determine the deviation between the areas and two-dimensional shapes of the modeled portions from the desired areas and two-dimensional shapes prior to processing of the work product, and if such deviations exceeds a desired deviation level, modeling the native work product again, but using alternative or additional modeling criteria to redetermine how the native work product might be divided into portions having desired areas and two-dimensional shapes and then determining the deviation of the potential portions achievable from the work product from the desired areas and two-dimensional shapes of the portions;
   (d) once the deviation between the modeled areas and two-dimensional shapes of the portions to be derived from the work product from the desired areas and two-dimensional shapes is within an acceptable level, the data processor is programmed to control one or more steps in the processing of the work product.

2. The system according to claim 1, further comprising a cutter for cutting the work product into selected portions.

3. The system according to claim 1, further comprising equipment for carrying out one or more steps in the processing of the work product or work product portions, wherein the one or more steps is selected from the group consisting of portioning, sorting, diverting, cooking, steaming, frying, baking, roasting, grilling, boiling, battering, freezing, trimming, de-boning, marinating, rolling, flattening, drying dehydrating, tenderizing, cutting, and slicing, and diverting the work piece.

4. The system according to claim 2, wherein the cutter is operated to cut the work product along less than the entire perimeter of the work product.

5. The system according to claim 1, wherein the processor in calculating the deviation of the area and two-dimensional shapes of the modeled work product portions relative to desired areas and two-dimensional shapes for the portions, utilizes one or more parameters selected from a group consisting of:
   (a) comparing the area of the portion with the area of the desired perimeter configuration;
   (b) comparing the portion area disposed within the perimeter of the desired perimeter configuration with the total area of the desired perimeter configuration;
   (c) comparing the total outside perimeter area of the portion, overlaid on the desired configuration with the area of the desired perimeter configuration; and
   (d) comparing the area defined by the determined outer perimeter of the portion extending beyond a desired perimeter configuration of the portion when overlaid with the desired perimeter configuration, with the area defined by the desired perimeter configuration.

6. The system according to claim 5, wherein the processor is programmed to combine two or more calculated parameters to arrive at a single parameter that provides an indication of the deviation of the modeled work product portion from the desired perimeter configurations therefor.

7. The system according to claim 6, wherein the processor is programmed to apply adjustable coefficients to one or more of the calculated parameters.

8. The system according to claim 7, wherein the adjustable coefficient is based on the predetermined relative importance of the calculated parameters.

9. A method of processing a native work piece based on the determined perimeter of the work piece, comprising:
 (a) scanning the native work piece;
 (b) determining the outer perimeter of the scanned native work piece;
 (c) comparing the determined outer two-dimensional perimeter of the work piece with one or more desired two-dimensional perimeter configurations;
 (d) prior to processing the work piece, calculating the deviation of the determined two-dimensional outer perimeter of the work piece from the desired two-dimensional perimeter configuration; and
 (e) based on the calculated deviation, carrying out one or more steps in the processing of the work piece.

10. The method of claim 9, wherein the step of carrying out one or more steps in the processing of the work piece is selected from the group consisting of: portioning, sorting, cooking, steaming, frying, baking, roasting, grilling, boiling, battering, freezing, trimming, deboning, marinating, rolling, flattening, drying, dehydrating, tenderizing, cutting, and slicing the work piece; data recording relative to the work piece; conducting statistical process control relative to the work piece.

11. The method of claim 9, wherein the step of determining the outer two-dimensional perimeter of the work piece is at least partially based on expected changes to the outer two-dimensional perimeter due to further processing of the work piece.

12. The method of claim 11, wherein the step of carrying out one or more steps in the processing of the work piece is selected from the group consisting of: portioning, sorting, cooking, steaming, frying, baking, roasting, grilling, boiling, battering, freezing, trimming, deboning, marinating, rolling, flattening, drying, dehydrating, tenderizing, cutting, and slicing the work piece.

13. The method according to claim 9, wherein the desired two-dimensional perimeter configuration can be composed of various user-defined shapes.

14. The method according to claim 13, wherein the various shapes are selected from the group consisting of round, oval, oblong, rectangular, elliptical, and square.

15. The method according to claim 9, wherein the step of comparing the determined outer two-dimensional perimeter of the work piece with one or more desired two-dimensional perimeter configurations comprising arranging the work piece perimeter at an angle and position so as to best match the desired perimeter configuration.

16. The method according to claim 9, wherein the step of calculating the deviation of the determined two-dimensional perimeter of the work piece from the desired two-dimensional perimeter configuration comprises calculating one or more parameters selected from the group consisting of:
 (a) comparing the area of the work piece with the area of the desired two-dimensional perimeter configuration;
 (b) comparing the work piece area disposed within the perimeter of the desired two-dimensional perimeter configuration with the total area of the desired two-dimensional perimeter configuration;
 (c) comparing the total outside perimeter area of the work piece, overlaid with the desired two-dimensional perimeter configuration, with the area of the desired two-dimensional perimeter configuration; and
 (d) comparing the area defined by the determined outer perimeter of the work piece extending beyond the desired two-dimensional perimeter configuration when overlaid with the desired two-dimensional perimeter configuration, with the area defined by the desired two-dimensional perimeter configuration.

17. The method according to claim 16, further comprising combing two or more calculated parameters to arrive at a single parameter, providing an indication of the deviation of the determined outer two-dimensional perimeter of the work piece with the desired two-dimensional perimeter configuration.

18. The method according to claim 17, wherein the method of combining two or more of the calculated parameters includes utilizing adjustable coefficients applied to one or more of the calculated parameters.

19. The method according to claim 18, wherein the two or more parameters are combined to arrive at a single parameter, using an equation selected from the group consisting of: weighted geometric mean; weighted arithmetic mean; weighted root mean square.

20. The method according to claim 17, wherein the two or more parameters are combined to arrive at a single parameter by utilizing a combining equation selected from the group consisting of: weighted geometric mean; weighted arithmetic mean; weighted root mean square.

21. A method of processing a native food product, comprising:
 (a) scanning a native food product;
 (b) determining the outer perimeter of the scanned native food product and the area of the food product;
 (c) modeling the food product to determine how the food product might be divided into portions having two-dimensional outer perimeters of sizes and two-dimensional shapes to match desired two-dimensional outer perimeter configurations for the portions;
 (d) comparing the modeled two-dimensional outer perimeters of the food product portions with the desired two-dimensional outer perimeter sizes and two-dimensional shapes;
 (e) prior to processing the food product, calculating the deviation of the two-dimensional outer perimeter sizes and two-dimensional shapes of the modeled portions from the desired two-dimensional perimeter configurations;
 (f) calculating one or more parameters corresponding to the deviation of the determined two-dimensional outer perimeters of the food product portions from the desired two-dimensional outer perimeter configurations; and
 (g) based on the calculated one or more parameters, carrying out one or more steps in the processing of the food product portions.

22. The method of claim 21, wherein the step of carrying out one or more steps in the processing of the food product is selected from the group consisting of portioning, sorting cooking, steaming, frying, baking, roasting, grilling, boiling, battering, chilling, freezing, trimming, de-boning, marinating, rolling, flattening, drying, dehydrating, tenderizing, cutting, and slicing the food product; carrying out data collection relative to the work piece; carrying out statistical process control relative to the work piece.

23. The method of claim 21, wherein the step of determining the outer perimeter of the food product portions is at least partially based on expected changes to the outer perimeter of the food product portions due to further processing of the food product portions.

24. The method of claim 23, wherein further processing of the food product is selected from the group consisting of: portioning, sorting cooking, steaming, frying, baking, roasting, grilling, boiling, battering, chilling, freezing, trimming, de-boning, marinating, rolling, flattening, drying, dehydrating, tenderizing, cutting, and slicing the food product.

25. The method according to claim 21, wherein the desired two-dimensional outer perimeter configurations can be composed of various shapes selected from the group consisting of: round, oval, oblong, rectangular, elliptical, and square.

26. The method according to claim 21, wherein the step of comparing the two-dimensional outer perimeters of the food product portion with one or more desired two-dimensional outer perimeter configurations comprising arranging the food product portion perimeter at an angle and position relative to the desired perimeter configuration to best match the desired two-dimensional outer perimeter configuration.

27. The method according to claim 21, wherein the calculated parameters are selected from the group consisting of:
  (a) comparing the area of the food product portion with the area of the desired two-dimensional outer perimeter configuration;
  (b) comparing the food product portion area disposed within the perimeter of the desired configuration with a total area of the desired two-dimensional outer perimeter configuration;
  (c) comparing the total of the outside perimeter area of the food product portion overlaid with the desired two-dimensional outer perimeter configuration, with the area of the desired two-dimensional outer perimeter configuration; and
  (d) comparing the area defined by the determined two-dimensional outer perimeter of the food product portion extending beyond the desired two-dimensional outer perimeter configuration when overlaid with the desired two-dimensional outer perimeter configuration, with the area defined by the desired two-dimensional outer perimeter configuration.

28. The method of claim 27, further comprising two or more calculated parameters to arrive at a single parameter providing an indication of the deviation of the determined two-dimensional outer perimeter of the food product portion from the desired two-dimensional outer perimeter configuration.

29. The method of claim 28, wherein the method of combining two or more of the calculated parameters includes utilizing an adjustable coefficient supplied to one or more of the calculated parameters.

30. The method according to claim 28, wherein the two or more parameters are combined to arrive at a single parameter by utilizing a combining equation selected from the group consisting of: weighted geometric mean; weighted arithmetic mean; weighted root mean square.

31. The method according to claim 21, wherein if the calculated deviation of the two-dimensional outer perimeter sizes and two-dimensional shapes of the modeled portions are not within a prescribed range of the desired two-dimensional outer perimeter configurations for the modeled portions, repeating the step of modeling the food product to determine how the food product might be divided into portions having outer perimeters of sizes and two-dimensional shapes to match desired two-dimensional outer perimeter configurations using alternate or additional modeling criteria or options and then comparing the modeled two-dimensional outer perimeters of the food product portions with the desired two-dimensional outer perimeter sizes and two-dimensional shapes and calculating the deviation of the modeled outer perimeter sizes and two-dimensional shapes of the modeled two-dimensional portions from the desired two-dimensional perimeter configurations.

32. A method according to claim 31, wherein the additional modeling options are selected from the group consisting of beginning the modeling of the food product from a different location on the food product, rotation the food product before initiating the modeling of the food product, changing the specifications for the desired two-dimensional otter perimeter sizes and two-dimensional shapes for the portions to be cut from the food product.

\* \* \* \* \*

UNITED STATES PATENT AND TRADEMARK OFFICE
CERTIFICATE OF CORRECTION

| | |
|---|---|
| PATENT NO. | : 7,251,537 B1 |
| APPLICATION NO. | : 11/323480 |
| DATED | : July 31, 2007 |
| INVENTOR(S) | : George Blaine et al. |

It is certified that error appears in the above-identified patent and that said Letters Patent is hereby corrected as shown below:

| COLUMN | LINE | ERROR |
|---|---|---|
| 1 | 52 | "and does so" should read --and do so-- |
| 2 | 63 | "18 cutting" should read --18 for cutting-- |
| 5 | 34 | "by user" should read --by a user-- |
| 6 | 12 | "is known" should read --are known-- |
| 6 | 30 | "or octagon." should read --or an octagon.-- |
| 7 | 16 | "occur. For" should read --occur; for-- |
| 7 | 25 | "equations. For" should read --equations; for-- |
| 8 | 64 | "steps, for" should read --steps; for-- |
| 10 (Claim 1, | 23 line 15) | "such deviations" should read --such deviation-- |
| 10 (Claim 1, | 31 line 23) | "portions;" should read --portions; and-- |
| 10 (Claim 3, | 47 line 8) | "drying" should read --drying,-- |
| 10 (Claim 3, | 48 line 9) | "piece." should read --product.-- |

Signed and Sealed this
Thirtieth Day of August, 2011

David J. Kappos
*Director of the United States Patent and Trademark Office*

CERTIFICATE OF CORRECTION (continued)
U.S. Pat. No. 7,251,537 B1

| COLUMN | LINE | ERROR |
|---|---|---|
| 11 (Claim 15, | 60 line 4) | "comprising" should read --comprises-- |
| 12 (Claim 22, | 66 line 3) | "sorting" should read --sorting,-- |
| 13 (Claim 24, | 13 line 3) | "sorting" should read --sorting,-- |
| 13 (Claim 26, | 25 line 4) | "comprising" should read --comprises-- |
| 14 (Claim 32, | 40 line 4) | "rotation" should read --rotating-- |
| 14 (Claim 32, | 43 line 7) | "otter" should read --outer-- |